June 17, 1930. J. E. KENNEDY 1,764,108
FEEDING DEVICE FOR MATERIALS
Original Filed Dec. 10, 1927

Joseph E. Kennedy
INVENTOR.

BY Charles A. Clark
ATTORNEY.

Patented June 17, 1930

1,764,108

UNITED STATES PATENT OFFICE

JOSEPH E. KENNEDY, OF NEW YORK, N. Y.

FEEDING DEVICE FOR MATERIALS

Original application filed December 10, 1927, Serial No. 239,156. Divided and this application filed October 23, 1928. Serial No. 314,527.

My invention relates to feeders for materials but refers more particularly to feeders for coal, stone or chemicals where an even feed is required and more especially to stationary feeding devices.

One object of my invention is to provide a device for feeding materials which has an adjustable cutting off knife or blade.

Another object of my invention is to provide a material feeder that combines a rotating disc, an adjustable knife feeder and a dust proof driving means.

This application is divisional of the application filed Dec. 10, 1927, Serial Number 239156.

Disc feeders with scrapers delivering the materials from the center of the disc to the outside as heretofore produced would be unsuitable for feeders on movable machinery such as railroad locomotives, and ships at sea, as the rolling motions or jars due to sudden stops or associated with such use would allow the materials fed to slide from the bin over the disc to the floor.

Disc feeders heretofore used allowed a certain amount of material to pass off the disc, wherein this particular device is provided with a cylindrical band surrounding the disc feeder except where the material is delivered to the spout, said band independently supported.

The band around the disc may be either supported from a stationary part of the disc feeder or from a swinging arm and may be made adjustable for taking care of the wear on the band and the disc.

It is well known in the art that disc feeders have been used but none contemplate the unique combination of novel elements utilized in producing the remarkable results obtained by this particular device.

With these and other objects in view, my invention consists of the novel construction, arrangement of parts and formation of the same, hereinafter referred to and described, claimed and substantially as illustrated in the accompanying drawings, wherein similar numerals refer to like parts throughout the several views, in which:—

Figures 1 and 2, illustrate the disc feeding device utilizing a revolving disc and which carries the material from the center of the disc over the edge or periphery from whence it is conveyed as desired.

Figure 1:
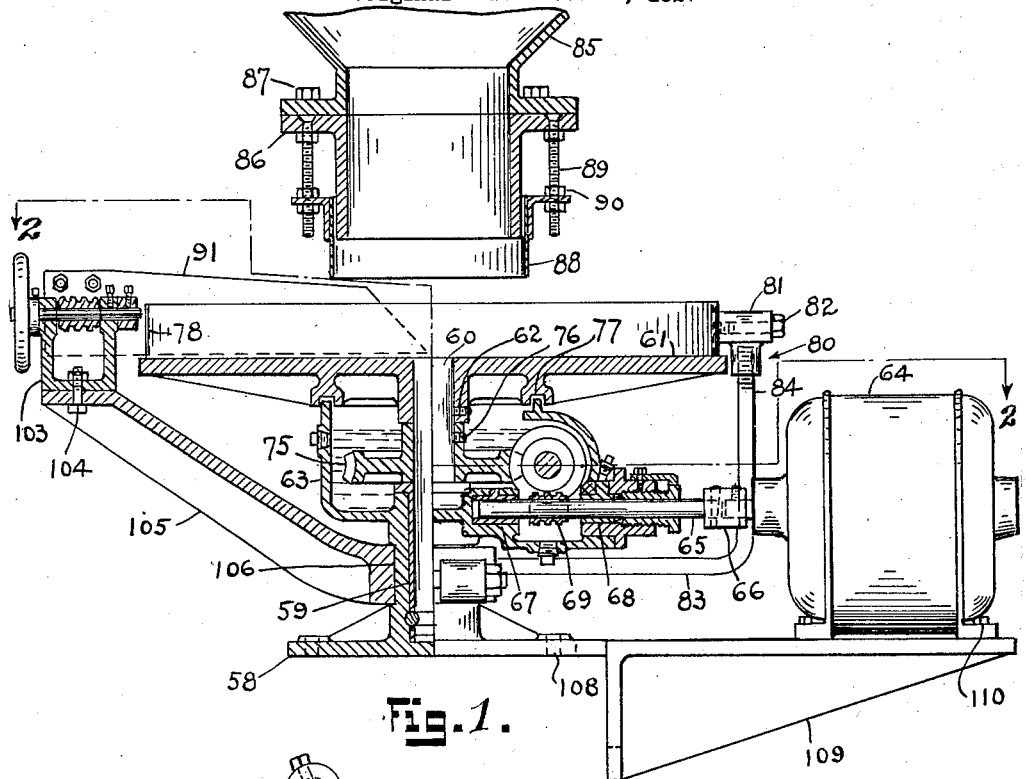
Figure 1, is a partial cross section of the disc feeder.
Figure 2:
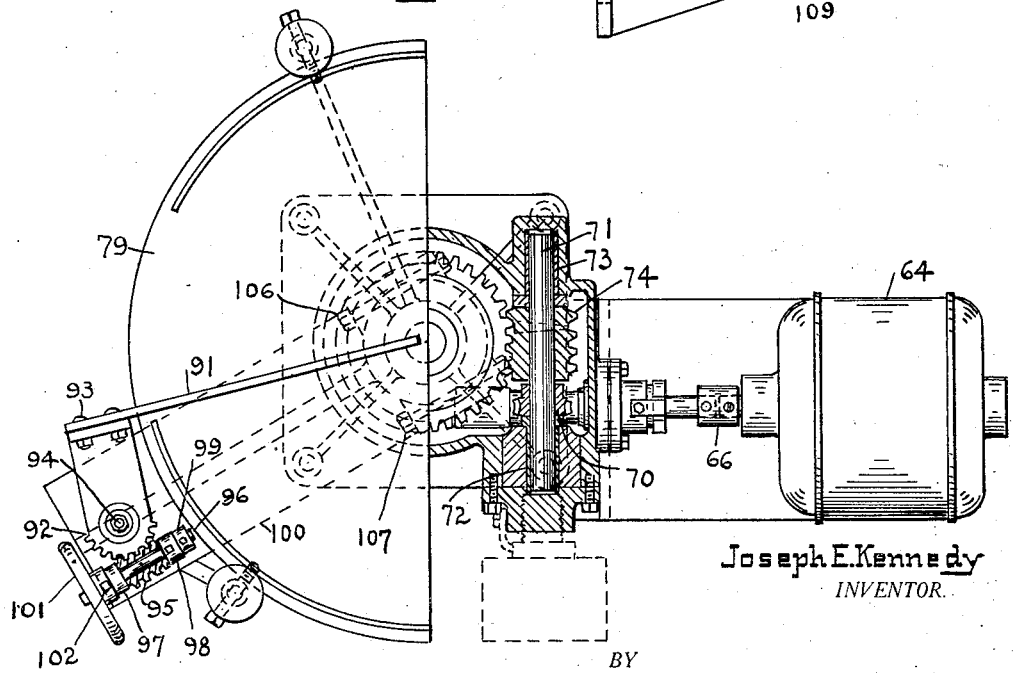
Figure 2, is a plan, partly in section of Figure 1, taken on lines 2—2 of Figure 1.

A swinging arm is mounted on the central axis of the apparatus permitting the swinging of the knife from one side of the feeder to the other and away from the spout, enabling the operator to catch a sample for a given number of revolutions of the disc which may be weighed and thereby the weight or the quantity by bulk being cut from the disc per revolution may be determined so as to indicate the quantity of materials being fed per minute, hour or day.

This rotary disc feeder is comprised of a base 58, with a bearing 59, carrying a shaft 60, the upper end of which is attached to a disc 61, by the set screw 62, and this bearing 59, has a flanged casing 63, integral thereof, which contains the driving mechanism.

The driving mechanism comprises a motor 64 which may be driven at variable speeds, connected to a driving shaft 65, by the coupling 66, said shaft running in the bearings 67 and 68, carrying a worm 69, which meshes with a worm wheel 70, on shaft 71, also carrying a worm 74, meshing with a worm wheel 75, held to the shaft 60, by the set screw 76.

This casing 63, extends above the driving mechanism and projects into a groove 77, integral with the disc 61, thus preventing dust from entering into the casing 63.

Adjacent to the periphery of the disc 61, is a retaining ring 78, broken away at 79, and supported by a multiple of supports 80.

The adjustable supports 80, comprise a casting 81, which is attached to the ring 78, by the bolts 82, said casing being supported by the rod 83, threaded at 84, to allow for adjustment when the ring 78, wears away.

Material is fed to the center of the disc 61, from the bin or receptacle 85, to which is bolted a flanged pipe 86, by the bolts 87, and to this pipe 86, is adjustably attached a pipe 88 for controlling the height of the material delivered on the disc 61, and this adjustment is accomplished by means of the bolts 89 and nuts 90.

The material is moved from the center of the disc 61, by means of the blade 91, bolted to the segment 92, by the bolts 93, which segment is pivoted at 94.

This segment 92, meshes with a worm 95, on the shaft 96, running in the bearings 97 and 98, on one end of which shaft is a collar 99, held thereto by the set screw 100, and to the other end of the shaft is fastened a hand wheel 101, by means of the set screw 102.

The bearings 97 and 98, are part of a U shaped casting 103, which is bolted by the bolt 104, to an arm 105, adjustably held to the base 58, by the bolts 106 and 107.

The whole apparatus may be fastened to any suitable place by means of bolts, not shown, which may pass through the holes 108, and the motor 64, or any other suitable driving means may be fastened to a bracket 109, by the bolts 110, and the bracket fastened in any suitable manner to the base 58.

In operation, material is fed from the source of supply 85, through the pipe 86, and the height of the pile on the disc 61, regulated by adjusting the pipe 88, whereupon the blade 91, when suitably adjusted will direct material through the opening 79, to any suitable means for conveying the same where desired.

Having thus described and illustrated the preferred embodiment of my invention, I do not wish to limit myself to the exact construction or arrangement shown, since it is evident that modifications may be made therein without departing from the spirit of the invention or scope of the claims.

I claim:—

1. In a disc feeding device for materials, a base, a rotatable disc, a centrally arranged feeding means, a peripherally arranged material retaining means, an adjustable blade directing materials from the center of said disc, an oil immersed driving mechanism within said base and means for variably driving the said mechanism.

2. In a disc feeding device for materials, a base, an adjustable centrally arranged material feeding means, a rotatable disc, a peripherally arranged material retaining means, an adjustable plow directing materials from the center of said disc, an oil immersed dust proof driving mechanism within said base, operably connected to said disc and means for variably driving the said mechanism.

3. In a disc feeding device, the combination with a rotatable disc of an adjustable frame adjacent to the periphery of said disc holding and carrying a material retaining means and substantially surrounding the disc cooperating with means directing material from the center of said disc to the periphery.

4. In a disc feeding device, the combination with a rotatable disc of an adjustable knife adapted to direct materials outwardly from within a material retaining frame, substantially surrounding and adjustably held adjacent to the periphery of the said disc by a multiple of arms fixed to an adjustable knife supporting arm carrying said knife, which is adapted to direct materials from the center of said disc to the periphery thereof.

5. In a disc feeding device for materials, a base formed to provide a reservoir for oil, a vertical shaft carrying a rotatable disc, a centrally arranged feeding means, a peripherally arranged material retaining means, an adjustable blade directing materials from the center of said disc to the periphery thereof, an oil immersed driving mechanism within said reservoir connected to said shaft and to a variable driving means, said reservoir formed to rotatably hold said vertical shaft to provide means for oiling the same.

Dated at New York in the county of New York and State of New York, this 19 day of October, 1928.

JOSEPH E. KENNEDY.